Nov. 10, 1931.  V. J. MOHLER  1,831,363
PRINTING DEVICE
Filed Dec. 4, 1929
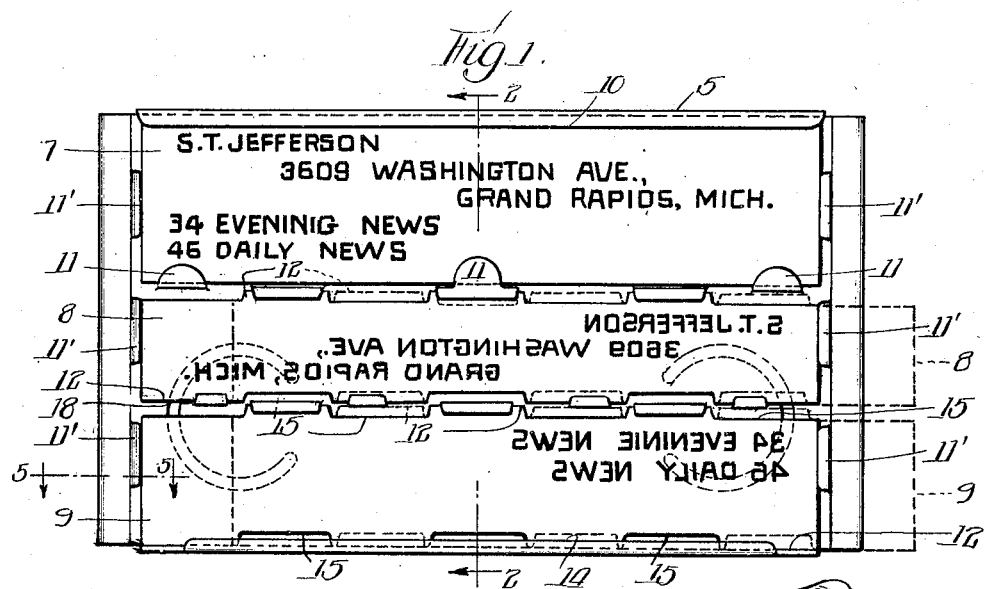
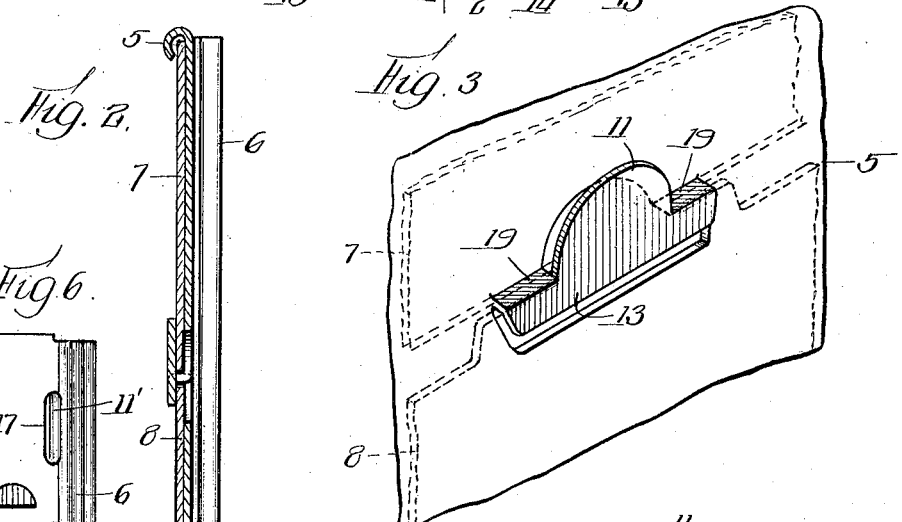
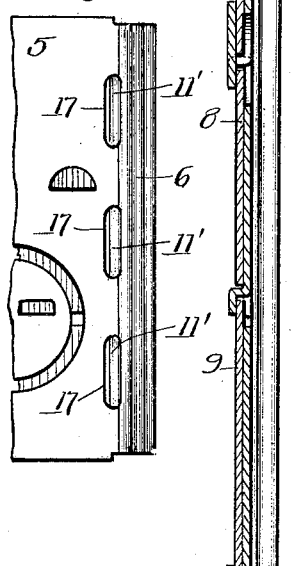
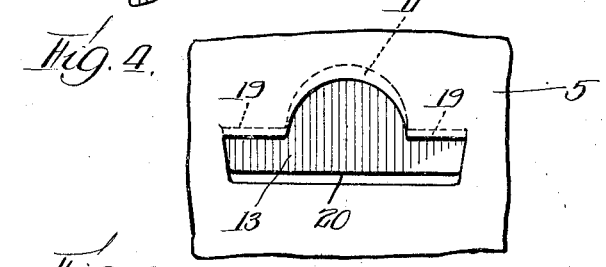
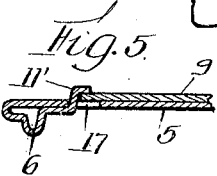

Patented Nov. 10, 1931

1,831,363

UNITED STATES PATENT OFFICE

VALENTINE J. MOHLER, OF RIVER FOREST, ILLINOIS, ASSIGNOR TO ADDRESSOGRAPH COMPANY, OF WILMINGTON, DELAWARE, A CORPORATION OF DELAWARE

PRINTING DEVICE

Application filed December 4, 1929. Serial No. 411,418.

This invention relates to printing devices of that class which are adapted to be stored in accordance with a card index system and to be run through addressing or other machines for printing. These devices commonly comprise a frame and one or more plates having printing characters embossed thereon, the frame being provided with retaining means for detachably securing the plate in place thereon. The retaining means have comprised overlapping parts struck up wherever convenient from the frame, and opposing edges of the plate are engaged with these overlapping parts by full endwise movement of the plate on the frame. It is desirable to have the plate fit as fixedly as possible in the retaining devices on the frame and therefore provision is made for a close fit which makes it difficult to insert the plates in the frames and to remove the plates from the frames by a full endwise movement. If the parts are made so that the plate can be slid freely they will not hold the plate as fixedly on the frame as desired. Sometimes the edges of the plate are scalloped but this increases instead of decreases the difficulty because of the number of projections that may catch on the ends of the retaining devices and obstruct the sliding movement of the plate.

It is the object of my invention to enable the plate to be partly mounted on the frame by a transverse movement which enables it to be engaged with the retaining devices on the frame by a relatively slight sliding movement of the plate, thereby facilitating the insertion of a plate in the frame or the removal of a plate from the frame.

It is also the object of my invention to construct and dispose the projections on the plate and the retaining devices on the frame so that the plate may be inserted by a transverse movement on the plate section of the frame in position to be engaged with the retaining devices by a short sliding movement which engages each projection with only a single retaining device.

Another object of the invention is to make the frame flexible at its ends so that it can be easily bent without permanently distorting the frame to clear the retaining devices on the frame from either end of the plate or plates to enable removal of the plate from the frame.

A further object of the invention is to provide a frame with yielding pressure sections which may overlap two plates and adapted to be operated independent of or in conjunction with bending the end of the frame to clear the stops from the end of the plate or plates to permit removal thereof.

And a further object of the invention is to provide combined oppositely directed lips stamped up from the frame in the same plane to retain different parts on the frame.

In the accompanying drawings,

Fig. 1 is a front view of a printing device embodying my invention and comprising two printing plates.

Fig. 2 is a sectional view on the line 2—2 of Fig. 1.

Fig. 3 is a detail perspective view showing the double retaining device.

Fig. 4 is a detail view showing the back of the frame at the double retaining device.

Fig. 5 is a detail sectional view on the line 5—5 of Fig. 1.

Fig. 6 is an elevation showing a portion of the back of the frame.

Referring to the drawings 5 is the frame which is made of sheet metal and provided on its back with spacing flanges 6 at its ends and on its front with retaining devices to receive and hold an information card 7 and the two plates 8 and 9 having retaining characters embossed thereon. I have shown the invention embodied in a frame with an information card and two printing plates but it will be apparent that the invention is described so that it can be embodied in a frame with one printing plate or with more than two printing plates and with or without an information card. The card is removably held in place on the frame by a bead 10 at the top of the frame and additional retaining devices 11. The plates are provided with projections 12 spaced apart at the top and bottom edges and the frame is provided with a retaining lip 13 for each projection, the lips being spaced apart on the frame in a special arrangement except at the bottom of the frame where it is provided with a continuous bead to receive all the projections 12 at the bottom of the lower plate. This bead might just as well be made of a plurality of spaced lips like the lips 13 for the bottom edge of the upper plate. Besides functioning as a retainer for the lower edge of the bottom plate the bead 14 also strengthens the frame like the top bead 10 against transverse bending. For this additional strengthening function it is preferred to provide the beads at the top and bottom of the frame instead of disconnected lips as retaining means for the top edge of the card and the bottom edge of the lower plate as has been customary heretofore.

It has been the practice heretofore to provide the frame with retaining lips for receiving and holding the edges of the plate or plates but these lips have been arranged where it is most convenient to place them and with the intention that the plate should be slid with a full endwise movement into position on the frame. Sometimes the plates have been stamped with scalloped edges from a sheet because this enables a given number of plates for a certain number of type lines to be stamped from a single sheet, but there has never been any relation established between the scalloped edges and the retaining devices except that the retaining devices shall overlap the scalloped edges. The reason for this has been that the printing plates have always been slid with a full endwise movement into position on the frame, except in some comparatively rare instances in which one plate has been arranged in any convenient movement on the frame to be held in place by another plate. I have found that the operation of engaging a plate with the frame and of disengaging a plate from the frame can be more easily and more quickly performed by shaping and spacing the retaining devices and the projections on the plate with particular relation to each other. Thus the projections on the plate are spaced apart at the top and bottom edges in staggered relation, that is to say, the projections on the top edge and on the bottom edge of the plate are not opposite but are staggered, the projections on one edge being located opposite the recesses 15 on the other edge. The retaining lips for the upper plate 8 are the same in number and they are staggered and arranged in the same relation as the projections on the plate, that is to say, there is a lip on the frame for each projection on the plate and the lips are spaced apart so that the plate in upright position may be placed flatly, or by slight transverse movement on the frame with projections on the plate arranged in the spaces between the retaining lips and then, by slight endwise movement, the plate is brought to its final position, Fig. 1. It will probably be a matter of choice on the part of the operator whether the plate is positioned with a forward movement or with a transverse down movement in initial position on the frame. Either way of doing it is permitted by the arrangement of the projections and retaining devices but I believe that operators will find it convenient to carry the plate to the frame in a forward down movement which I refer to as a transverse movement, engaging the lower edge of the plate first with the frame and then flattening the plate against the frame with the projections on the plate arranged in the spaces between the lips on the frame. It is preferred that the plate be arranged on the frame in initial position with the projection 12 at the lower left corner of the plate 8 in the space between the two lips 13 to engage the lower edge of the plate 8 adjacent the left end thereof as shown in broken lines in Fig. 1, and with the other projections on the plate engaging the recesses between the retaining lips with which they will then register. Then it requires an endwise movement of the plate to the left about equal to the length of a projection to bring the plate to final position, Fig. 1. The plate may be removed by sliding it to the position shown in broken lines in Fig. 1 whereupon it can be removed by lifting it from the frame. It will be observed that arranging the plate on the frame in initial position shown in broken lines is much simpler and more easily accomplished than inserting the end of the plate in the retaining devices at one end of the frame preliminary to the full endwise sliding movement of the plate as heretofore practiced, and that the short sliding movement of the plate on the frame from initial to final position is much more easily accomplished, and more quickly, than the full endwise movement of the plate, as heretofore practiced. The lower plate is inserted and removed in substantially the same manner as the upper plate except that it is necessary that the lower plate should be given a transverse movement to engage the projections of its lower edge with the bead at the bottom of the frame after which the plate is flattened against the frame with the projections on its upper edge in the spaces between the retaining devices for the upper edge of the plate, as indicated in broken lines in Fig. 1. The lower plate is slid from initial to final position and from final to initial position like the upper plate and the entire operation of inserting and removing it is substantially the same as in the case of the upper plate. The retaining devices 11' at the ends of the frame are in the form of stops stamped up from the frame to engage the ends of the card and plate and prevent endwise movement thereof. As shown in Fig. 5 the frame is slit at each of these stops and the stop is pressed up on the front of the frame, thus making an elongated recess 16 in the back of the frame with a slit 17 therein. There are three stops arranged in alignment and equally spaced from each other and from the top and bottom edges of the frame. The effect of these stops on the frame is to make it more flexible at the flanged portion so that it can be bent sufficiently to clear the stop from the end of the plate to facilitate removal of the plate. The flanged end portion of the frame will also yield sufficiently, if need be, to permit freedom of engagement of the projections on the plate with the retaining lips on the frame in assembling the plate with the frame. To further facilitate the removal of the plate I provide the frame with yielding pressure sections 18 which overlap the two plate sections of the frame and are adapted to be pressed from the back of the frame to lift one or the other or both plates sufficiently to clear the end stops. The plates may be cleared of the stops to permit removal of the plates from the frame by pressing upon the flanged end portion and bending the frame or by pressing the pressure sections from the back of the frame, but it is more convenient to accomplish this by bending the frame and pressing the pressure section at the same time. The flanged right end of the frame is grasped between the thumb and forefinger of the right hand and while the thumb presses down on the flanged end of the frame the forefinger presses up on the pressure section to clear the plate or plates from the stop or stops. This is a natural pressure of the thumb and forefinger, that is to say to press down with the thumb it is natural to press up with the forefinger and vice versa so that no additional effort is required to bend the end of the frame and operate the pressure section conjointly to clear the plate or plates from the stop or stops. I prefer to provide a pressure section adjacent each end of the frame to facilitate insertion and removal of the plates at either end of the frame, and since the pressure sections are preferably made sufficiently large to overlap two plates it will be necessary to provide some of the retaining lips on the pressure sections. A retaining lip 11 for the card is formed on one or more of the retaining lips 13 for the upper plate, Figs. 3 and 4. The lip 11 is shorter than the lip 13 Fig. 3, and it projects upward in the same plane as the lip 13 projects downward. A shelf 19 is formed on the top of the lip 13, where it connects with the frame, at each end of the lip 11. The lower edge of the card 7 rests upon the shelves 19 and the upper edge of the plate 8 is arranged to engage the under side of the shelves 19. By thus combining the lip 11 with the lip 13 one opening 20 instead of two openings is formed in the back of the plate and this reduces the weakening effect which would be occasioned by two openings spaced apart as shown by the other lips 11 engaging the lower edge of the card and the lips 13 adjacent thereto. These other lips 11 and 13 may be combined as shown in Fig. 3 if desired. When the upper plate 8 is inserted on the frame in initial position shown in broken lines, Fig. 1, the projections on the upper edge of the plate will lie in the spaces between the retaining lips which are provided to engage said projections and the projections on the lower edge of the plate will lie between the retaining lips on the frame to engage said projections and will rest upon the retaining lips for the upper edge of the lower plate so that the plate will thus be initially positioned for the edge projections thereon to slidably enter the retaining lips. The bead 14 at the lower edge of the frame combines the function of supporting the plate in its initial position and the function of retaining the lower edge of the plate on the frame in final position.

My invention provides a printing plate of novel and simple but strong and substantial construction which greatly facilitates insertion and removal of plates, reduces the labor or operation in inserting and removing plates and enables this work to be done with greater ease and more quickly than has been the practice heretofore. The frame can be made from a stock frame in accordance with my co-pending application Serial No. 411,416, filed December 4, 1929, and changes may be made in the form, construction and arrangement of parts to adapt the invention for other printing devices, or for other purposes, within the scope of the following claims.

I claim:

1. A printing device of the class described comprising a frame, a printing plate having type characters thereon, and means on the frame for removably retaining the plate thereon, said plate having spaced projections on its top edge and the retaining means for the top edge of the plate being correspondingly spaced and adapted to overlap said projections, the retaining means for the lower edge of the plate adapted to overlap said lower edge, the projections on the top edge of the plate and the retaining means for the top edge of the plate being so spaced that when the plate is overlapped for a substantial part of its length over the frame, the lower edge of the plate may be inserted in the retaining means therefor by a transverse movement of the plate relative to the frame and the projections on the top edge of the plate may be positioned against the frame between the retaining means for the top edge of the plate to permit the plate to be moved lengthwise by a slight relative movement in the retaining means to final position on the frame with its top and bottom edges held by the retaining means.

2. A printing device of the class described comprising a frame, a printing plate having type characters thereon, and means on the frame for removably retaining the plate thereon, said plate having projections on its top and bottom edges staggered with relation to each other and spaced apart, and said frame having retaining devices staggered with relation to each other to engage the projections on the top and bottom edges of the plate, those retaining devices which engage the projections on the top edge of the plate being spaced apart to permit projections on the plate to lie therebetween in initial insertion position of the plate on the frame and so that the projections may be engaged with said retaining devices by a relatively slight endwise sliding movement of the plate on the frame to final position.

3. A printing device of the class described comprising a frame, a retaining device struck up from the frame and comprising two lips projecting in opposite directions and conjointly connected with the body of the frame, one of said lips being stamped partly out of said connection of the lips with said body.

4. A printing device of the class described comprising a frame, a retaining device struck up from the body of the frame and comprising a connection with the frame, a lip on said connection extending in one direction substantially parallel with the body of the frame, and another lip struck up partly from the body of the frame and partly from said connection and extending from the connection substantially parallel with the body of the frame and in a direction opposite to the other lip.

VALENTINE J. MOHLER.